(12) United States Patent
Ferrero et al.

(10) Patent No.: US 10,845,121 B2
(45) Date of Patent: Nov. 24, 2020

(54) METHOD AND PLANT FOR THE THERMAL TREATMENT OF FRICTION ELEMENTS, IN PARTICULAR BRAKE PADS

(71) Applicant: ITT ITALIA S.r.l., Lainate (IT)

(72) Inventors: Sergio Ferrero, Barge (IT); Pierluigi Regis, Barge (IT); Francesco Laureri, Barge (IT)

(73) Assignee: ITT ITALIA S.r.l.

( * ) Notice: Subject to any disclaimer, the term of this patent is extended or adjusted under 35 U.S.C. 154(b) by 310 days.

(21) Appl. No.: 15/579,681

(22) PCT Filed: Jun. 6, 2016

(86) PCT No.: PCT/IB2016/053307
§ 371 (c)(1),
(2) Date: Dec. 5, 2017

(87) PCT Pub. No.: WO2016/193957
PCT Pub. Date: Dec. 8, 2016

(65) Prior Publication Data
US 2018/0142954 A1     May 24, 2018

(30) Foreign Application Priority Data

Jun. 5, 2015   (IT) .................. 102015000020870

(51) Int. Cl.
| | |
|---|---|
| *F27B 9/24* | (2006.01) |
| *F26B 15/18* | (2006.01) |
| *F27D 5/00* | (2006.01) |
| *F27B 9/36* | (2006.01) |

(Continued)

(52) U.S. Cl.
CPC ............ *F27B 9/243* (2013.01); *C21D 9/0056* (2013.01); *C21D 9/0068* (2013.01); *F16D 69/00* (2013.01);

(Continued)

(58) Field of Classification Search
CPC ..... F27B 2009/3088; F27B 9/243; F27B 9/36; F16D 69/00; F16D 2250/00;
(Continued)

(56) References Cited

U.S. PATENT DOCUMENTS 4,537,823 A * 8/1985 Tsang ....................... B23P 15/18
                                                                264/101
5,364,258 A * 11/1994 Buckley .............. B29C 35/0266
                                                                156/166

(Continued)

FOREIGN PATENT DOCUMENTS

| DE | 20 2009 015250 U1 | 5/2010 |
|---|---|---|
| DE | 20 2012 103521 U1 | 11/2012 |

(Continued)

OTHER PUBLICATIONS

International Search Report and Written Opinion; dated Aug. 22, 2016; 10 pgs.

*Primary Examiner* — Steven S Anderson, II
(74) *Attorney, Agent, or Firm* — Barclay Damon LLP

(57) ABSTRACT

A method and plant for the thermal treatment of friction elements including a convective heating step which is performed within a convective tunnel oven. The friction elements are arranged laid, in an orderly manner, upon a plurality of trays each tray having a perforated resting plate upon which the friction elements are laid in a position next to one another only, but not overlapped. The trays are piled on top of each other whilst being kept distanced from one another in a stacking direction by an amount that is greater than the thickness of the friction elements. Groups of piled up trays containing the friction elements are arranged side by side on belt conveyor means that pass through the tunnel oven in order to transport the friction elements therethrough.

10 Claims, 4 Drawing Sheets

(51) Int. Cl.
*C21D 9/00* (2006.01)
*F16D 69/00* (2006.01)
*F16D 65/092* (2006.01)
*F27B 9/30* (2006.01)

(52) U.S. Cl.
CPC .............. *F26B 15/18* (2013.01); *F27B 9/36* (2013.01); *F27D 5/0006* (2013.01); *F27D 5/0031* (2013.01); *F16D 65/092* (2013.01); *F16D 2250/00* (2013.01); *F27B 2009/3088* (2013.01)

(58) Field of Classification Search
CPC .... F16D 65/092; F27D 5/0031; F27D 5/0006; C21D 9/0068; C21D 9/0056; F26B 15/18
See application file for complete search history.

(56) References Cited

U.S. PATENT DOCUMENTS

| | | | | |
|---|---|---|---|---|
| 5,906,485 | A | * 5/1999 | Groff | ............... A21B 1/48 432/121 |
| 2013/0071800 | A1 | * 3/2013 | Gausmann | ............ F27B 9/022 432/11 |
| 2016/0038967 | A1 | * 2/2016 | Tarasco | ................ B05D 1/06 427/475 |

FOREIGN PATENT DOCUMENTS

DE     202012103521     * 11/2012
WO     WO 2016/193957 A1     12/2016

\* cited by examiner

METHOD AND PLANT FOR THE THERMAL TREATMENT OF FRICTION ELEMENTS, IN PARTICULAR BRAKE PADS

CROSS REFERENCE TO RELATED APPLICATIONS

This application is a national stage application under 35 U.S.C. § 371 of International Application No. PCT/IB2016/053307, filed Jun. 6, 2016, which claims priority of Italian Patent Application No. 102015000020870, filed Jun. 5, 2015, the entire contents of each application being herein incorporated by reference.

TECHNICAL FIELD OF THE INVENTION

The present invention relates to a method and plant for carrying out thermal treatments on friction elements, in particular braking elements such as brake pads.

PRIOR ART

After the completion of the braking element forming step, the friction materials used as seals in the brake shoes of drum brakes and as brake pads in disk brakes for vehicles and other equipment (such as clutch discs) need to undergo a thermal treatment that both enhances the characteristics of said materials and makes it possible to eliminate any residual gases.

In particular, in the case of brake pads, the pads, upon leaving the forming press, are heated for a certain period of time at temperatures generally slightly higher than 200° C., usually by means of convection ovens.

The thermal treatment plants commonly in use today include, as a main element, a horizontal or vertical convective oven.

The vertical ovens (known as "Paternoster" ovens) are provided with a chain conveyor having an ascending arm and a descending arm arranged within an insulated enclosure. The brake pads are arranged on the tray supports, which are individually attached to the chain conveyor, which conveys them within the insulated enclosure, wherein a series of heating zones is arranged that are provided with electrical resistances; when the supports reach the end of the descending arm, the thermal treatment of the brake pads should have been completed, at which point the brake pads are removed and the tray supports are transported to the beginning of the ascending arm to be loaded for a new cycle of work.

This type of plant is expensive, complicated, and very cumbersome.

The latter inconvenience, i.e. the large encumbrance, is also present if horizontal convective tunnel ovens are used, such as, for example, in WO2014162282, where the brake pads in order to be submitted also to the IR treatment, must be placed on a conveyor belt that runs within a tunnel oven in the same longitudinal direction as a flow of hot air/gases, which passes through the convective oven from one end to the other of the same.

Also known from DE202009015250U and DE202012103521U is a method for performing the baking of tiles or other bricks in a conventional oven, where the objects to be baked are arranged on stackable shelves made from a ceramic material.

SUMMARY OF THE INVENTION

The purpose of the present invention is to provide a method and plant for the thermal treatment of friction elements, in particular of braking elements such as brake pads, which allow for the treatment of a large number of braking elements with reduced dimensions and lead times, while ensuring optimal adhesion of the actual thermal cycle implemented by the plant to that envisaged during the design phase.

The invention is thus related to a method and plant for carrying out thermal treatments of friction elements, especially braking elements such as brake pads, having the characteristics set out in the attached claims.

The plant of the invention can be arranged immediately downstream of a forming step of braking elements and allows for the uniform heating at the same temperature of all of the braking elements treated. It also allows for continuous thermal treatment. Finally, braking elements treated using the method and plant of the invention have surprisingly been shown to have better performance than the same braking elements treated using traditional methods or plants.

In particular, a notable increase in productivity is obtained compared to prior art ovens. In addition, given that the method of the invention includes the arrangement of the braking elements on independent trays, said trays can be stored and managed within the oven thereby maximizing the filing of the entire available volume. Finally the method and plant of the invention are more efficient than the "paternoster" oven, especially when high output volumes are required. Another advantage is that, as mentioned above, the temperature measured on the brake pads treated with the plant of the invention are very accurate, stable and repeatable compared to those that can be measured on the same pads treated with prior art ovens.

BRIEF DESCRIPTION OF THE DRAWINGS

Further characteristics and advantages of the present invention will become clear from the following description of an exemplary non-limiting embodiment given purely by way of example and with reference to the figures within the accompanying drawings, wherein.

DETAILED DESCRIPTION

Figure 1:
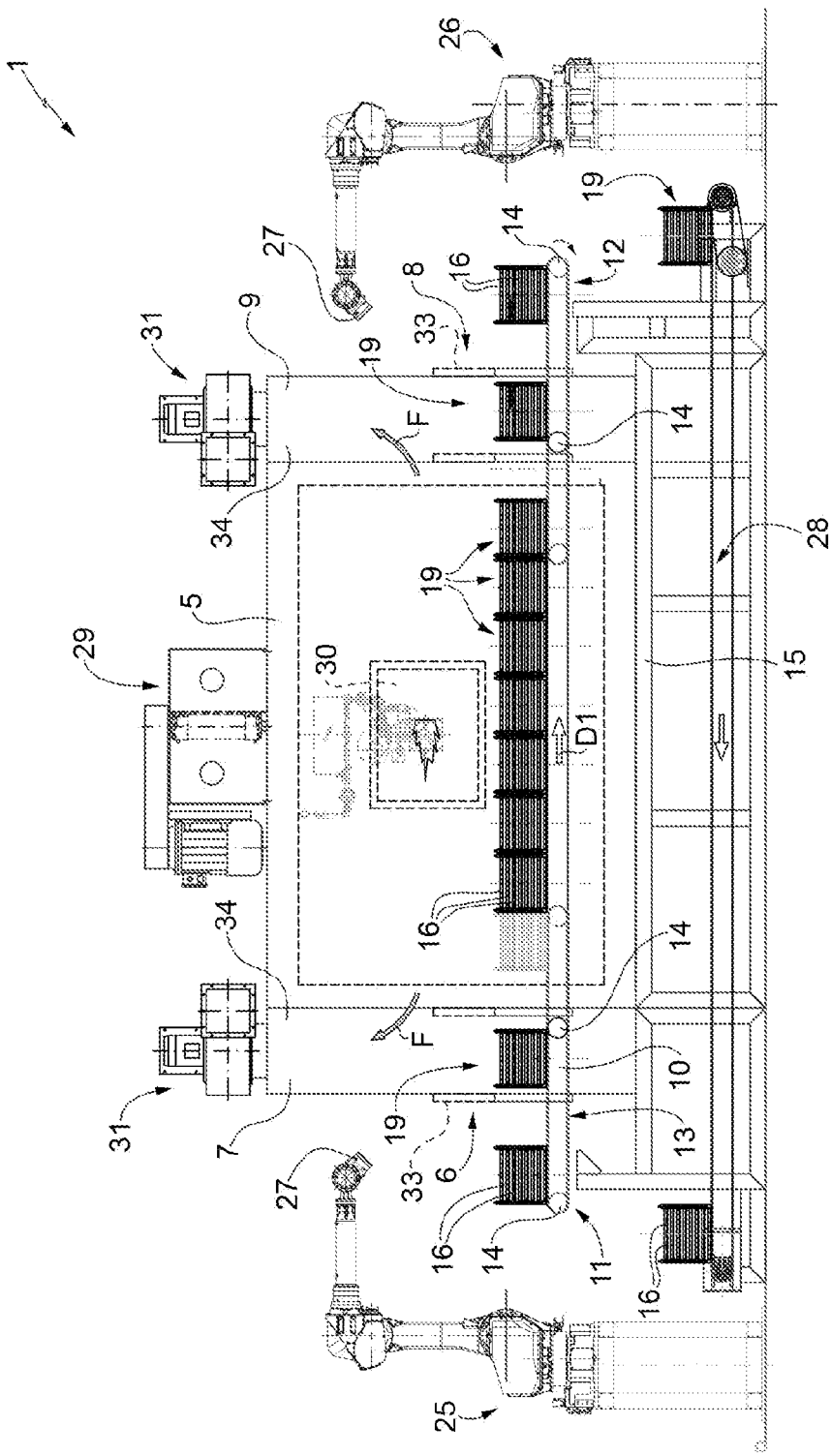
FIG. 1 shows a longitudinal schematic view of a plant for the thermal treatment of friction elements, in particular brake pads, according to the invention.
Figure 2:
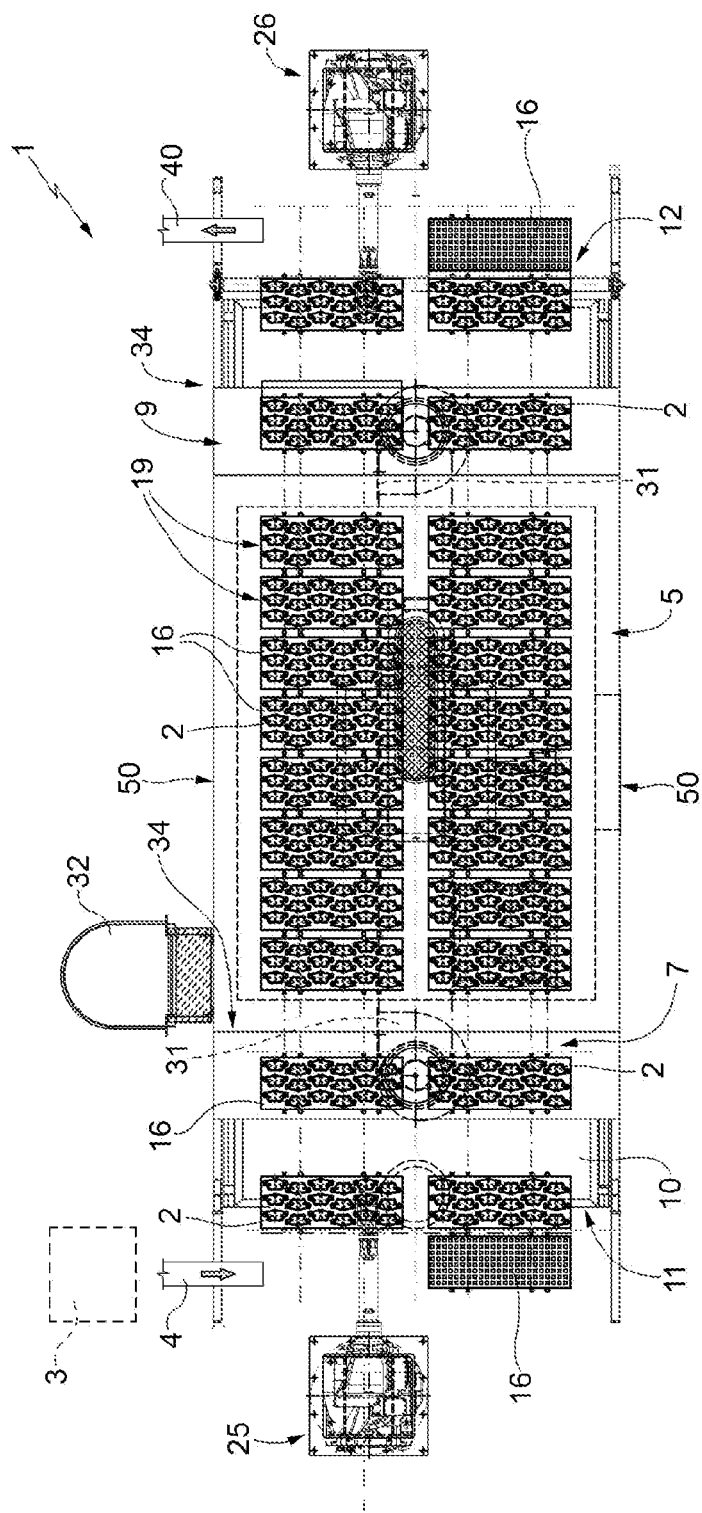
FIG. 2 shows a schematic plan view of the plant in FIG. 1.

With reference to FIGS. 1 and 2, presented as a whole with 1 is a plant for the thermal treatment of braking elements 2, in particular brake pads (FIG. 3), which are known and illustrated for the sake of simplicity schematically only. More generally, the plant 1, though designed to treat braking elements, can perform a desired thermal treatment on friction elements of any type, for example clutch discs. In the following non limiting description, without the loss of any information in general, specific reference will be made to brake pads.

The plant 1 is preferably but not necessarily placed immediately downstream of a station 3, known and indicated schematically with a hatched block in FIG. 2, which is designed to carry out a known forming step upon the braking elements 2, comprising the pressing of a block of friction material onto a metal support.

The braking elements 2 leave the station 3 and the corresponding forming step and are transferred to the plant 1, by means of a known type of conveyor 4, for example consisting of a conveyor belt, upon which the braking elements 2 are laid out according to a known arrangement and technique.

The plant 1 comprises a convective tunnel oven 5 presenting an inlet opening 6 at its first end 7 and an outlet opening 8 at its second end 9, opposite the first end 7.

The plant 1 also includes conveyor means 10, for example comprising of one or more "belt" type conveyors, implemented in the form of a single conveyor belt or as a plurality of conveyor belts arrayed head to head and/or side by side, which pass(es) through the convective tunnel oven 5; in the example illustrated there are two conveyors 10 that are positioned next to each other and that have a development length that is greater than that of the tunnel oven 5 in order to have their first and their second opposing ends 11 and 12 of the conveyors 10 arranged externally to the tunnel oven 5, from which they emerge by means of the inlet and outlet openings 6 and 8, respectively.

The conveyors 10 are preferably implemented in the form of a transportation belt(s) of the known so-called "endless" type, in which at least one flexible element (belt) 13, "endless" in so far as the opposite extremities of the belt are connected together to form a closed stretched loop, is supported and moved by rollers 14, at least some of which are motorized, supported by a structure 15.

Figure 3:
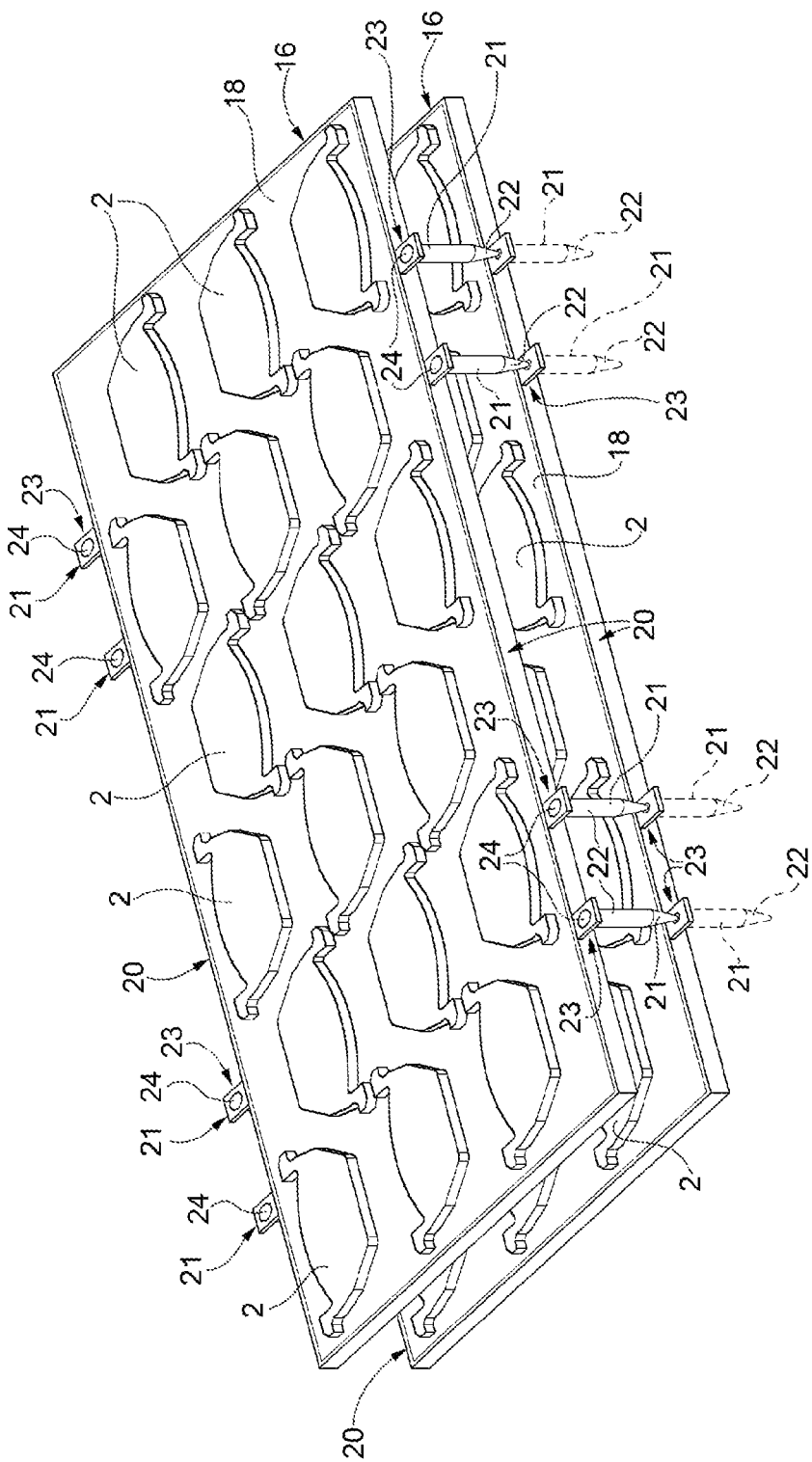
FIG. 3 shows a large scale perspective view from above of three quarters of the key components of the plant in FIGS. 1 and 2, arranged as per the usage configuration.

According to a first characteristic of the invention, the plant 1 also includes a plurality of trays 16, two of which are explained in detail and illustrated at a large scale in FIG. 3.

The trays 16 each have a resting plate 18 which is evenly perforated and designed such that the friction elements 2 can be laid directly onto the perforated resting plate 18 laid in a position next to one another only, but not overlapping, as is well illustrated in FIG. 3.

The trays 16 are further designed to be piled on top of each other (generally in a vertical direction) whilst being kept distanced from one another in a stacking direction by an amount that is greater than the thickness of the friction elements 2 in the same stacking direction.

In FIG. 3, two trays 16 are stacked one on top of the other, but, in general, the trays 16 are stackable in groups 19 of multiple trays 16, such as seven or eight.

In addition, the conveyors 10 are designed to be loaded, at their first end 11, with groups 19 of stacked trays 16 containing the friction elements 2 and to transport a plurality of groups 19 of stacked trays 16 arranged next to one another through the convective oven 5 up to the outlet opening 8, at a controlled speed, determined for example by motorized rollers 14 or by other means of propulsion, of a known type and not shown for simplicity, for example mechanical pushers.

According to one aspect of the invention, each tray 16 includes, corresponding to at least one pair of its opposite sides 20 (in the example shown in FIG. 3 the trays 16 are rectangular and the sides are 20 are longitudinal sides) a plurality of resting feet 21 each of which has a bottom end 22 and an upper end 23.

The resting feet 21 of each tray 16 are cantilevered and protrude towards, and from, the part of their bottom end 22 below the perforated resting plate 18 of the tray 16, and the upper end 23 of each resting foot 21 has a seat 24 which is designed to receive and support the bottom end 22 of a corresponding resting foot 21 of another tray 16. The bottom ends 22 of the resting feet 21 are conical and the seats 24 of the upper ends 23 are circular such that the resting feet 21 of two overlapping trays 16 determine a self centering action for the piled up trays 16.

According to an aspect of the invention, the trays 16 are cut and pressed from metal sheeting, and the resting feet 21, which are also metallic, are hollow on the inside and welded along the sides 20. The trays 16 are therefore relatively light.

According to another aspect of the invention, the plant 1 comprises at least one first manipulation robot 25 and one second manipulation robot 26, each with at least three numerically controlled axes of movement, the first robot 25 being positioned in front of the first end 11 of the conveyors 10 and the second robot 26 in front of the second end 12 of the conveyors 10.

The robots 25 and 26 can be of any known type, in the illustrated non-limiting example they are of the anthropomorphic type, and are each provided with a head 27 (FIG. 1) which is designed to grip the trays 16 one at a time and to move groups of friction elements 2, by means of a single movement, to and from the trays 16, from and to the respective conveyors for the friction elements 2.

In the non-limiting example illustrated, the heads 27 are provided with suction cups and/or grippers and/or magnetic grippers, known and not illustrated for simplicity, and the plant 1 is served by two conveyors, the conveyor 4 is arranged laterally at the end 11 of the conveyor means 10 and a conveyor 40 is arranged laterally at the end 12 of the conveyor means 10.

The robot 25 picks up, by means of the head 27, for example using the suction cups, for example a group of three friction elements 2 from the conveyor 4, if required it rotates them, and deposits them on the perforated support plate 18 of a tray 16 deposited and resting on the conveyor means 10, such as to arrange the group of elements 2 perpendicularly to the sides 20. The robot 25 continues by picking up another group of three (in the non-limiting example illustrated) friction elements 2 and places them adjacent to but not overlapping, next to the preceding side, preferably in a staggered manner, as illustrated in FIG. 3, such as to increase the filling of the perforated support plate 18, up until the tray 16 is completely full; it is noteworthy that according to the invention the filling of the trays 16 with the elements 2 is never complete, in the sense that portions of the support plate 18, which are provided with perforations, must remain free, such that air can freely circulate around the friction elements 2.

Figure 4:
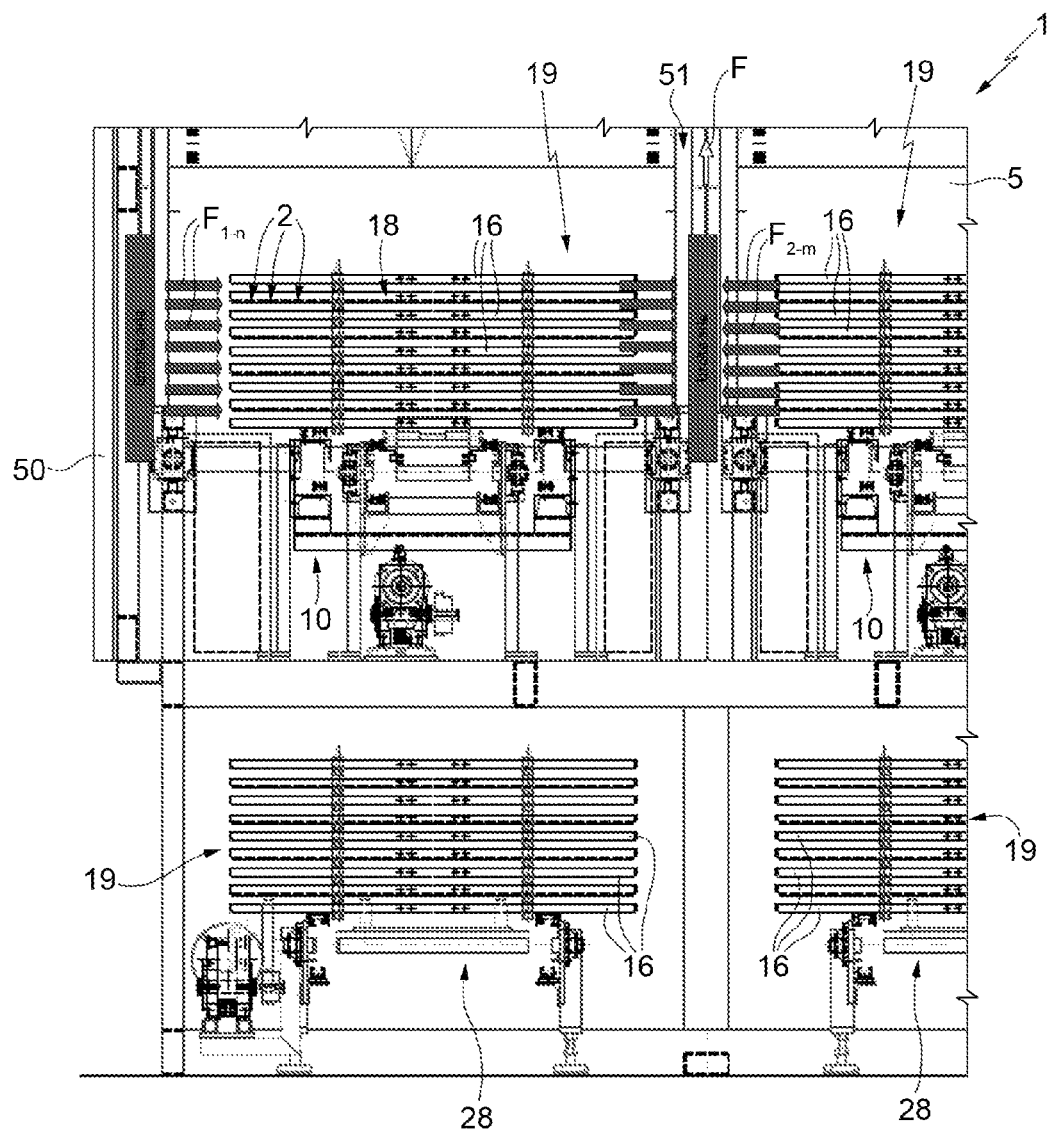
FIG. 4 shows an enlarged scale transversal schematic view of a second component of the plant in FIG. 1.

The robot 25 subsequently picks up an empty tray 26, as will be seen, again by means of the head 27 and places it above, but vertically removed from, the tray 16 that has just been filled with friction elements 2, it then begins also to fill this tray 16 with friction elements 2 and so on until a group 19 of stacked trays 16 is formed. In the meantime the conveyors 10, moving slowly, transport the groups 19 of trays 16 that have just been completed into the oven 5, in the example illustrated in groups of two at a time, arranged side by side on the conveyor means 10, illustrated for simplicity as a single straight conveyor belt in FIGS. 1 and 2. It is clear however that the conveyor means 10 can include for example two adjacent lines implemented by means of two identical conveyor belts 10, positioned next to each other, as illustrated in FIG. 4, or by means of, for example, three conveyor belts arrayed head to head, each one being independently motorized.

At the opposite end 12 the robot 26 picks up groups of three (in the illustrated example) friction elements 2 from the tray 16 at the top of each group 19 of trays 16 that exits the outlet opening 8, and places them, for example after rotation of the head 27, onto the conveyor 40, which carries the treated friction elements 2 on to subsequent processing and/or to packaging. When there are no more friction elements on the tray 16 at the top of each group 19 of trays 16, the robot 26 picks up the empty tray 16 and then passes to the next, and so on until the trays 16 of each group 19 of trays 16 are empty.

In the non-limiting example illustrated (FIG. 1), below the oven 5 and externally to the same there are two conveyor belts 28 side-by-side, the upper surfaces of which move in the opposite direction to an upper surface of the conveyors 10, as shown by the arrows in FIG. 1.

The robot 26 places the empty trays 16 onto the conveyor belt 28 situated below each conveyor 10, stacked one on top of one another in groups 19. The groups 19 of empty trays 16 are transported by the conveyor belts 28 back towards the end 11, where they are picked up one at a time by the robot 25 and transported back on the conveyors 10, where they are filled with friction elements 2 and re-stacked, as previously described, to be re-fed into the oven 5. Of course, also in this case the two conveyors 28 can be replaced by a single double-width conveyor 28 and/or a series of conveyors 28 arranged in tandem, head to head along the longitudinal length of the oven 5.

According to another feature of the invention, the convective tunnel oven 5 comprises environment air sucking means 29 (FIG. 1) and burner means 30 (illustrated schematically with a block only), comprising for example of one or more burners fed with the air sucked from the means 29 and by a suitable fuel, designed to generate a flow F of burned gases (FIGS. 1 and 4). The means 29 and 30 are arranged substantially half way along the tunnel oven 5; also present are suction means 31 of the combustion products, that is, of the flow of burned gases F, consisting of at least one pair of extractors arranged substantially at the respective opposite ends 7 and 9 of the tunnel oven 5.

The fumes are then discharged through a stack 32 (FIG. 2), possibly after having passed through cavities in order to pre-heat the air sucked in by the means 29.

According to a not secondary characteristic of the invention, in order to ensure the desired optimal adhesion of the thermal cycle implemented by the plant to that envisaged during the design phase for the individual braking elements 2, the flow F of hot gases produced by the sucking means 29 and by the burner 30 is divided into a plurality of flows F1-Fn and F2-Fm which are transversely directed in the direction of travel of the conveyor belts 10 and of the trays 16 and that are fed into the oven 5 at different heights, such that each flow F1-Fn or F2-Fm flows substantially along side, or just above, the resting plate 18 of each tray 16.

In particular, the flows F1-Fn and F1-Fm are fed into the oven 5 through opposing longitudinal side walls 50 of the oven 5, from the outside to the inside and at right angles to the conveyors 10, to then be sucked by the extractors 31 through a central chimney 51 (FIG. 4) which extends along the full length of the oven 5. The transverse velocity of the flows F1-n and F2-m that pass over the trays 16 must be between 5 and 15 m/sec in order to obtain turbulence at each tray 16 and within the oven 5 that is designed for optimal heat exchange with the braking elements 2.

In the non-limiting example illustrated, the inlet and outlet openings 6 and 8 are provided with guillotine type sliding doors 33 that open into "compensation" chambers at the input and output 34, said chambers are in turn connected to the interior of the oven 5 by means of further passages that are closed by doors.

Based on what has been described, it is evident that by means of the plant 1, a method is implemented according to the invention, for the thermal treatment of friction elements 2, in particular consisting of braking elements such as brake pads, comprising a convective heating step in which the friction elements 2 are transported through a convective oven 5 that is heated in such a way as to obtain a desired temperature profile on the friction elements 2 and in which, according to the invention, the friction elements 2 are arranged laid, in an orderly manner, upon a plurality of trays 16 each having a perforated resting plate 18 upon which the friction elements 2 are laid in a position next to one another only, but not overlapped.

The trays 16 are successively piled up on top of each other whilst being kept distanced from one another in a stacking direction by an amount that is greater than the thickness of the friction elements 2 in the same stacking direction and the convective heating step is performed within a convective tunnel-type oven 5 having conveyor means 10 that passes through it, upon which conveyor means the trays 16 which are piled up and containing the friction elements 2 are placed, thus forming upon the conveyor means 10 a plurality of groups 19, arranged side by side, of piled up trays 16 such that by advancing the conveyors 10 in the direction of the arrow indicated with D1 in FIG. 1 the friction elements 2 are transported through the entire tunnel oven 5, from the end 7 to the end 9, entering the oven 5 by means of the inlet opening 6 and leaving by means of the outlet opening 8.

During the convective heating step the friction elements 2, which preferably comprise brake pads, are brought up to a temperature of between 140 and 300° C. by circulating, in a controlled manner thus causing the controlled circulation of a flow F of burned gases, due to forced convection, within the tunnel oven 5, dividing said flow F into a plurality of overlapping flows F1-n and F2-m, said flows opposing one another and being transversely directed in the direction of travel D1 of the conveyors 10.

Said flows of burned gases F1-n and F2-m is produced by sucking environment air and producing combustion substantially half way along the length of the tunnel oven 5, using means 29 and 30, then sucking the combustion products by means of at least one pair of extractors 31 positioned substantially at respective opposite ends 7,9 of the tunnel oven 5.

According to that which has been described, the friction elements 2 are arranged on the trays 16 and then taken from the trays 16 by means of at least one pair of manipulation robots 25,26 (the robots 25,26 can also be four, two robots 25 and two robots 26 positioned on the opposite sides of the oven 5) having at least three numerically controlled axis of movement and the first robot(s) 25 arranged at a first end 7 of the tunnel oven 5 provided with the inlet opening 6 and the second robot(s) 26 arranged at a second end 9 of the tunnel oven 5, opposite to the first end 7 and provided with the outlet opening 8 from the tunnel oven.

In addition, the trays 16 being picked up empty by the first robot 25 at the first end 7, are deposited empty onto the conveyors 10, a first tray 16 directly laid on the upper surface of the conveyor means 10 and subsequently filled by the first robot 25 with a plurality of friction elements 2, and the subsequent trays 16 piled on top of the first tray 16 and filled with friction elements 2 by the first robot 25 one at a time to form a group 19 of piled up trays 16.

The thermally treated friction elements 2 are picked up from the trays 16 by the second robot 26 at the second end 9, and the empty trays 16 are removed from the conveyor means 10 one at a time by the robot 26 and arranged upon the conveyor belt(s) 28, positioned below the tunnel oven 5, by means of which second conveyor belt 28 the trays 16 are carried back to the first end 7 to be picked up one at a time by the first robot 25.

Thanks to the method and plant described the filling of the oven 5 is optimized and the output of the oven is greatly accelerated, that is the quantity of friction elements 2 treated per unit of time is increased, whilst at the same time reducing the footprint of the oven 5. Selecting a convective tunnel oven leads to a drastic reduction also in the vertical dimensions whilst increasing productivity at the same time.

Finally, it has been experimentally found that the temperature profiles obtained on the friction elements 2 based upon equal thermal cycles are significantly more constant and uniform in the case of the plant and method according to the invention wherein it is the case that the same friction elements 2 are treated in known ovens, where the friction elements are laid directly onto a conveyor belt or onto supports that follow their movement through the oven and where, above all, the convective flow of hot gases is directed in a direction that is parallel to the direction of travel of the friction elements through the oven.

Each scope of the invention has thus been achieved.

The invention claimed is:

1. A method for the thermal treatment of formed friction elements in which the formed friction elements are transported through a convective oven, the method comprising:
   i) conveying friction elements from a forming station in which each friction element has been formed by pressing a block of friction material onto a metal support;
   ii) arranging the formed friction elements in an orderly manner upon a plurality of trays, each tray having a perforated resting plate upon which a number of the formed friction elements are laid in a position next to one another in non-overlapping fashion;
   iii) stacking the plurality of trays on top of each other whilst being kept distanced from one another in a stacking direction by an amount that is greater than the thickness of the arranged friction elements in the same stacking direction, and forming groups of the stacked trays, each of the trays comprising a plurality of resting feet cantilevered from longitudinal sides of the trays, each of the resting feet comprising an upper end and a bottom end in which the upper end of the resting feet includes a seat having an opening sized to receive the bottom end of corresponding resting feet of a stacked tray, thereby enabling the groups of stacked trays to be formed and broken down; and
   iv) convectively heating the arranged friction elements within a convective tunnel oven having a burner and a conveyor passing through it, in which the formed groups of the stacked trays having the arranged friction elements are placed side by side on the conveyor, such that by advancing the conveyor the arranged friction elements are transported through the convective tunnel oven in a direction (D1) of travel; wherein during the convective heating step the arranged friction elements are heated, by the burner, to a temperature of between 140° C. and 300° C., thus causing a controlled circulation of a flow (F) of burned gases, due to forced convection, within the convective tunnel oven;
   the flow (F) of burned gases being divided into a plurality of overlapping flows (F1-n; F2-m), said plurality of overlapping flows being opposite to one another and transversely directed in the direction of travel (D1).

2. The method according to claim 1, in which the flow of burned gases (F) is produced by sucking environment air, then sucking the combustion products using at least one pair of extractors positioned at or near respective opposite ends of the convective tunnel oven.

3. The method according to claim 1, in which the friction elements include brake pads.

4. The method according to claim 1, further comprising:
   v) removing each of the formed and thermally treated friction elements from the uppermost tray of a group of stacked trays;
   vii) removing the uppermost tray from the group of stacked trays, by pulling the bottom end of the cantilevered resting feet from the opening of the seat of the upper end of the tray beneath the uppermost tray; and
   viii) repeating steps v) and vi) until all of the formed and thermally treated friction elements and trays are removed from the group of stacked trays.

5. A method for the thermal treatment of friction elements wherein friction elements are transported through a convective oven, the method comprising:
   i) arranging the friction elements in an orderly manner upon a plurality of trays, each tray having a perforated resting plate upon which a number of the friction elements are laid in a position next to one another in non-overlapping fashion;
   ii) stacking the plurality of trays on top of each other whilst being kept distanced from one another in a stacking direction by an amount that is greater than the thickness of the arranged friction elements in the same stacking direction, and forming groups of the stacked trays;
   iii) convectively heating the friction elements within a convective tunnel oven having a burner and a conveyor passing through it, in which the formed groups of the stacked trays having the arranged friction elements are placed side by side on the conveyor, such that by advancing the conveyor the arranged friction elements are transported through the convective tunnel oven in a direction (D1) of travel; wherein during the convective heating step the arranged friction elements are heated, by the burner, to a temperature of between 140° C. and 300° C., thus causing a controlled circulation of a flow (F) of burned gases, due to forced convection, within the convective tunnel oven; the flow (F) of burned gases being divided into a plurality of overlapping flows (F1-n; F2-m), said plurality of overlapping flows being opposite to one another and transversely directed in the direction of travel (D1), and
   in which the friction elements are arranged on the trays and then taken from the trays by means of at least one pair of manipulation robots having at least three numerically controlled axes of movement arranged as a first manipulation robot at a first end of the convective tunnel oven which has an inlet opening into the oven and a second manipulation robot at a second end of the convective tunnel oven, opposite to the first end which has an outlet opening from the convective tunnel oven; the trays being taken empty by the first manipulation robot at the first end, being deposited empty onto the conveyor, a first tray directly laid on the conveyor and subsequently filled by the first manipulation robot with a plurality of friction elements, and the subsequent trays piled on top of the first tray and filled with friction elements by the first manipulation robot one at a time to form a group of piled up trays; the friction elements being taken from the trays by the second manipulation robot at the second end, and the empty trays are removed from the conveyor one at a time by the second manipulation robot and arranged upon a belt conveyor, positioned externally below the convective tunnel oven, and by means of the belt conveyor the empty trays are carried back to the first end to be taken one at a time by the first manipulation robot.

6. A plant for the thermal treatment of formed friction elements, each of the formed friction elements comprising a block of friction material pressed onto a metal support the plant comprising:

a tunnel convective oven presenting an inlet opening at a first end and an outlet opening at an opposing second end and a conveyor which passes through the tunnel convective oven, the conveyor having an extension in length that is greater than that of the tunnel convective oven, in order to have first and second opposite ends of the conveyor arranged externally to the convective tunnel oven, from which the conveyor emerges through inlet and outlet openings, respectively;

a plurality of trays, each tray having a perforated resting plate designed such that a number of the formed friction elements can be laid directly onto the perforated resting plate in a position next to one another in overlapping fashion;

the trays being designed to be piled on top of each other whilst being kept distanced from one another in a stacking direction by an amount that is greater than the thickness of the formed friction elements in the same stacking direction, each tray having a plurality of resting feet cantilevered from longitudinal sides of the tray, each of the resting feet comprising an upper end and an elongated bottom end, the upper end including a seat having an opening sized to receive the elongated bottom end of a vertically stacked tray;

the conveyor being designed to be loaded, at its first end, with groups of piled up trays containing the formed friction elements and to carry in a direction of travel (D1) a plurality of groups of piled up trays arranged side by side through the tunnel convective oven beyond the outlet opening, at a controlled speed; wherein the tunnel convective oven comprises apparatus for sucking from the environment coupled to at least a burner, which are configured to generate within the tunnel convective oven a plurality of flows of overlapping burned gases (F1-n; F2-m); and combustion product suckers including at least a pair of extractors positioned at, or close to, the respective opposite ends of the tunnel convective oven; the overlapping flows of burned gases (F1-n; F2-m) being opposite to one another and transversely directed in the direction of travel (D1).

7. The plant according to claim 6, in which the bottom ends of the cantilevered resting feet are conical and the seats of the upper ends are circular such that the resting feet of two overlapping trays determine a self centering action for the piled up trays.

8. The plant according to claim 6, further comprising at least one first and one second manipulation robot, each manipulation robot having at least three numerically controlled axes of movement, the at least one first manipulation robot being positioned in front of the first end of the conveyor and the at least one second manipulation robot being positioned in front of the second end of the conveyor; the at least one first and at least one second manipulation robot being provided with a head which is designed to grasp the trays of a stacked group of trays one at a time and to move the formed friction elements, in groups of one at a time, by means of a single movement, on and off the trays, to and from their respective conveyors for the friction elements.

9. The plant according to claim 6, in which the friction elements are braking elements.

10. The plant according to claim 9, in which the braking elements are brake pads.

\* \* \* \* \*